Figure 1:
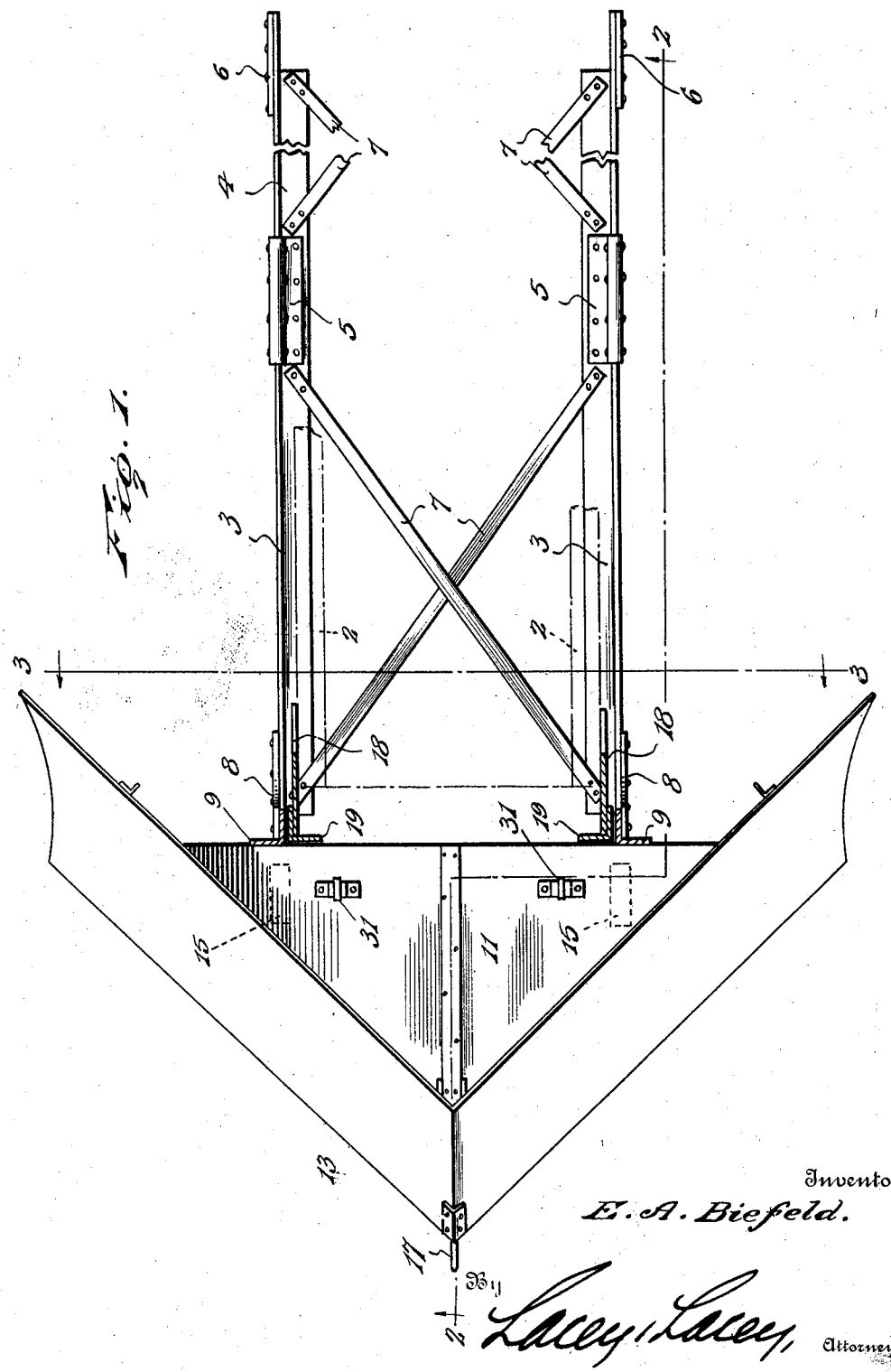

Sept. 9, 1930.   E. A. BIEFELD   1,775,483
MOTOR TRUCK SNOWPLOW
Filed Jan. 25, 1929   3 Sheets-Sheet 2

Inventor
E. A. Biefeld.
By Lacey & Lacey, Attorneys

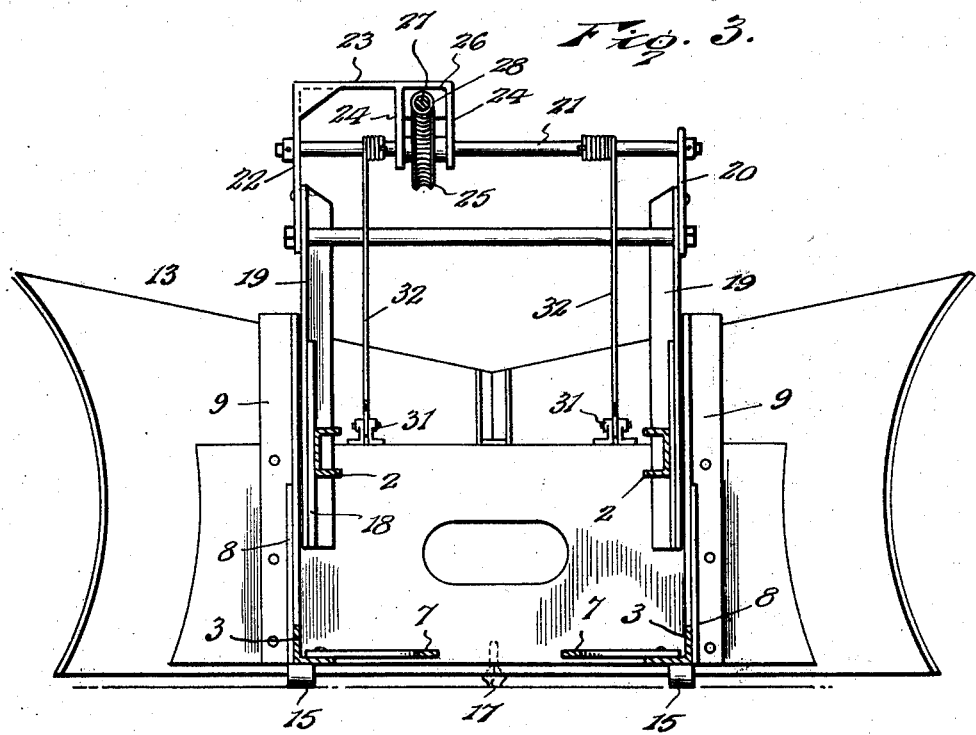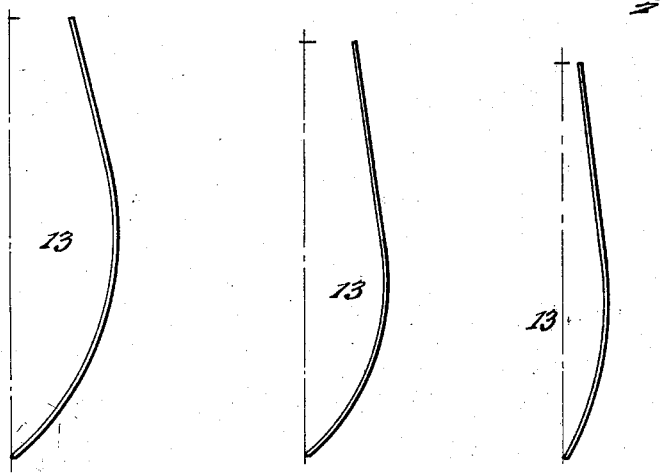

Patented Sept. 9, 1930

1,775,483

UNITED STATES PATENT OFFICE

ERNEST A. BIEFELD, OF WATERTOWN, WISCONSIN, ASSIGNOR TO OTTO BIEFELD COMPANY, OF WATERTOWN, WISCONSIN, A CORPORATION OF WISCONSIN

MOTOR-TRUCK SNOWPLOW

Application filed January 25, 1929. Serial No. 335,074.

This invention is a snow plow adapted to be connected to a motor truck of any type and propelled by the truck to clear a road in front of the truck steering wheels. The invention provides means whereby the plow will be supported in such manner that it may move readily over the road and may be raised and lowered as the requirements of the work may demand. The invention is illustrated in the accompanying drawings and will be hereinafter fully set forth.

Figure 2:
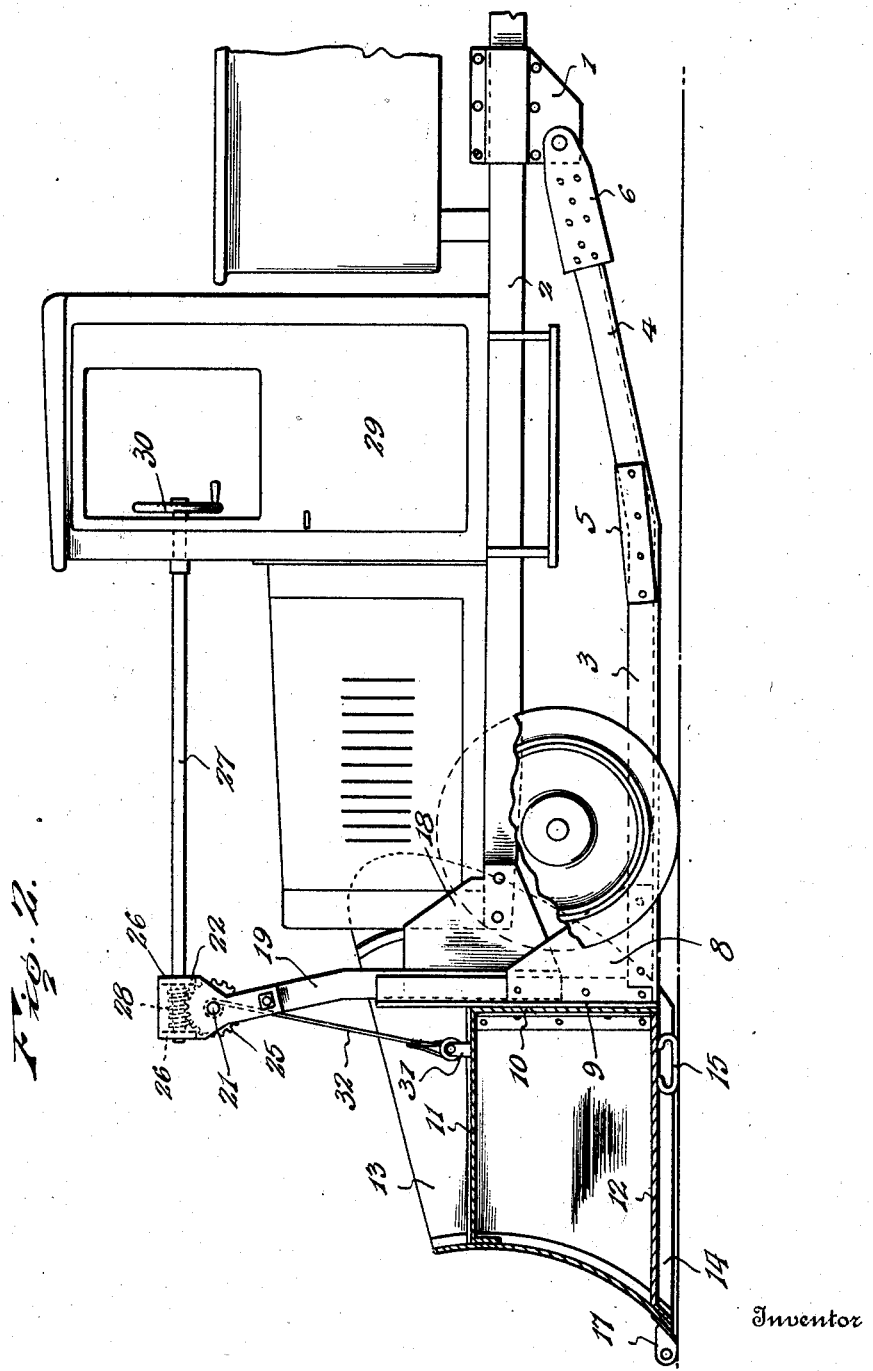

In the drawings:

Figure 1 is a view, partly in top plan and partly in horizontal section, of a snow plow embodying the present invention, Fig. 2 is a sectional elevation, partly broken away, on the line 2—2 of Fig. 1, Fig. 3 is a transverse section on the line 3—3 of Fig. 1, and Figs. 4, 5 and 6 are detail diagrammatic sections through the moldboard of the plow at different points in the length thereof.

In carrying out the present invention, there are provided anchoring plates 1 which are adapted to be removably but firmly secured to the chassis 2 of a motor truck and have their lower portions depend from the chassis, as shown clearly in Fig. 2. There are also provided push bars each of which consists of a forward section 3 and a rear section 4 disposed in bent or angular relation and a bracing plate 5 secured upon and reinforcing the bend between said sections, as shown. The rear end of the rear section 4 is secured to a coupling plate or yoke 6 which is pivoted to the lower pending portion of the anchoring plate 1, as shown clearly in Fig. 2. The push bars are further reinforced and held against spreading by braces 7 which are preferably arranged obliquely, as shown in Fig. 1. The push bars are preferably angle bars, as shown most clearly in Fig. 3, and at their front ends gusset plates 8 are secured thereto and project upwardly therefrom, vertically disposed angle bars or posts 9 being secured to and rising from the gusset plates and being in turn secured to the rear wall 10 of a bulk head. The bulk head comprises a top plate 11 and a bottom plate 12 which connect the transverse rear wall 10 with the rear side of the moldboard 13 which consists of two rearwardly diverging members, as shown clearly in Fig. 1. The forward edge of the bottom plate 12 is formed into a downwardly extending flange 14 conforming to and fitting against the rear side of the moldboard to which it is firmly secured, and near the rear end of the bottom plate 12 shoes 15 are secured thereto to run upon the ground and support the moldboard at all times slightly out of contact with the road surface so that, while it will remove snow, it will not dig into and take up the road material. The moldboard is concave on its front face, the radius of the concave arcs defined by the front surface of the moldboard gradually increasing from the center or point of the moldboard to the ends thereof. This formation causes the moldboard to take up the snow and instead of merely pushing it aside or ahead imparts a rolling action thereto so that it is more easily delivered at the side of the road. To further guard against the point of the moldboard digging into the roadbed, a fender 17 is secured on the front side of the moldboard at the point of the same.

Secured to the front end of the truck chassis and at each side thereof is a gusset plate 18 and to the front edge portion of said plate is secured a guide post 19 which is preferably an angle bar and rises above the hood of the truck. To the upper end of one guide post 19 is secured a straight bracket 20 which provides a bearing for one end of a winding shaft 21 and to the upper end of the other guide post 19 is secured a bracket 22 which also provides a bearing for the shaft 21 and it projects above the shaft where it is formed into an inwardly extending arm 23 having spaced depending lugs or plates 24 which fit around the shaft 21, as shown clearly in Fig. 3. The shaft is thus firmly supported, and, between the lugs or plates 24, a worm gear 25 is secured upon the shaft. The arm 23 also has front and rear depending webs 26 between the lugs or plates 24, and these webs provide bearing supports for the front end of an operating shaft 27 which is equipped with a worm 28 between said webs, which worm meshes with the gear 25, as will be understood upon reference to Fig. 2. The rear end of the shaft 27 is mounted in a suitable bearing provided therefor in the front wall of the truck cab 29 and is equipped with a hand wheel 30 within the cab. Brackets 31 are secured upon the top plate 11 of the bulk head, and in these brackets are fixed the lower ends of cables 32 which extend upwardly and are secured to the winding shaft 21 to be wound thereon.

It will be readily noted that by turning the hand wheel 30 the winding shaft 21 may be rotated in proper direction to wind or unwind the cables 32 and thereby raise or lower the bulk head and the moldboard. The plow can thus be readily set so as to operate most efficiently under any given conditions. It will be noted that the posts 9 which are secured to the bulk head and connected to the push bars are disposed at the outer sides of the respective guide posts 19 which are held by the gusset plates 18 secured rigidly to the chassis of the truck. The posts 9 are arranged close to the guide posts, as shown in Fig. 1, and are not only guided vertically when the plow is being adjusted but are also held thereby against lateral movement relative to the truck so that they are kept to the road in advance of the truck. The propelling power of the truck is transmitted, to some slight extent, through the plates 18 and the guide posts 19 but is principally transmitted through the push bars which are pivoted to the anchoring plates 1, and the bent or angular formation of the push bars will give a greater range of vertical adjustment than could be attained by bars extending on straight lines from the anchoring plates to the plow without impinging against the front axle or some other part of the truck. It will be noted that the push bars are disposed between the steering wheels of the truck and below the axle and close to the ground so that the strength of the push bars is applied most effectually to cause forward movement of the plow and to resist the thrust imposed thereon.

Having thus described the invention, I claim:

The combination with a vehicle and plates secured to the sides and projecting forwardly thereof, of push bars pivoted at their rear ends to the vehicle, gusset plates at the forward ends of the push bars, a plow, a bulkhead on the rear of the plow, angle posts secured to the bulkhead and gusset plates, angle guide posts secured to the plates carried by the vehicle and acting jointly with the angle posts carried by the plow to direct the latter in its vertical adjustments and brace it laterally, a shaft at the upper end of the guide posts, and cables between the said shaft and bulkhead to effect vertical adjustment of the plow.

In testimony whereof I affix my signature.

ERNEST A. BIEFELD. [L. S.]